United States Patent [19]
Ikeda et al.

[11] Patent Number: 5,924,529
[45] Date of Patent: Jul. 20, 1999

[54] DRUM BRAKE DEVICE WITH SINGLE SHOE EXTENSION DEVICE

[75] Inventors: Takashi Ikeda, Nagoya; Seiji Asai, Okazaki, both of Japan

[73] Assignee: Nisshinbo Industries, Inc., Tokyo, Japan

[21] Appl. No.: 08/831,868

[22] Filed: Apr. 2, 1997

[30] Foreign Application Priority Data

Apr. 5, 1996 [JP] Japan ..................................... 8-110151
Apr. 17, 1996 [JP] Japan ..................................... 8-119622

[51] Int. Cl.⁶ ..................................................... F16D 51/06
[52] U.S. Cl. ...................... 188/331; 188/106 F; 188/325; 188/196 BA; 188/79.54
[58] Field of Search .............................. 188/79.51, 79.54, 188/79.56, 196 BA, 106 A, 106 F, 79.62, 79.63, 79.64, 325, 331, 332, 78, 342, 323, 79.55, 106 R, 198

[56] References Cited

U.S. PATENT DOCUMENTS

| | | | |
|---|---|---|---|
| 2,131,369 | 9/1938 | Brisson | 188/106 A |
| 2,161,641 | 6/1939 | Schnell | 188/106 A |
| 2,232,308 | 2/1941 | Berglund | 188/331 |
| 2,250,248 | 7/1941 | Berglund | 188/325 |
| 2,280,784 | 4/1942 | Berno | 188/325 |
| 2,347,239 | 4/1944 | Berno | 188/325 |
| 2,503,489 | 4/1950 | James, Jr. | 188/106 A |
| 3,010,544 | 11/1961 | Dahle et al. | 188/196 BA |
| 3,034,603 | 5/1962 | Bauman | 188/196 BA |
| 3,067,840 | 12/1962 | Werner | 188/196 BA |
| 3,823,799 | 7/1974 | Margetts | 188/78 |
| 4,270,632 | 6/1981 | Langert | 188/196 BA |

*Primary Examiner*—Douglas C. Butler
*Attorney, Agent, or Firm*—Nikaido, Marmelstein, Murray & Oram LLP

[57] ABSTRACT

A drum brake device is provided in which a single shoe extension device activated by the service brake can yield a braking force equivalent to that of a two leading (2L) type of drum brake device, and which facilitates the incorporation of a parking brake device and an automatic shoe clearance adjustment device. A link (10) is pivoted on an anchor pin (2), the central segment of the link (10) is engaged with the one brake shoe (4), a shoe clearance adjuster (14) is mounted between the link (10) and the other brake shoe (5) between the other pair of adjacent ends of the two brake shoes, wherein braking force can be mutually transferred between the two brake shoes (4, 5) by means of the link (10) and the shoe clearance adjuster (14).

20 Claims, 18 Drawing Sheets

DRUM BRAKE DEVICE WITH SINGLE SHOE EXTENSION DEVICE

BACKGROUND OF THE INVENTION

This invention relates to a drum brake device in which a single shoe extension device activated by the service brake can yield a stable braking force equivalent to that of a two-leading (2L) type of drum brake device.

Drum brake devices which employ a single shoe extension device activated by the service brake are generally of the leading-trailing (LT) or duo-servo (DS) type. However, although the LT drum brake provides stable braking, the braking force is low, being particularly insufficient for use on trucks. On the other hand, a DS drum brake presents uncertainties as to stability upon braking because a sudden increase of the braking effect when the coefficient of friction being higher can induce early locking of the brake, or can easily create an imbalance in the braking force between the left and right wheels. Two drum brake devices known to provide relatively good braking power and stable braking effect are the two-leading (2L) and dual-two-leading (D2L) types, both of which are equipped with two shoe extension devices, such as a wheel cylinder, positioned symmetrically about the axle.

A 2L or D2L drum brake device each has the following issues to be considered. Incorporation of a parking brake device is difficult in part because of layout restrictions and increased intricacy of structure. A separate transmission brake device can be used, but that increases the weight and the cost of the vehicle.

The presence of two shoe extension devices makes it difficult to design the drum brake with just one automatic shoe clearance adjustment mechanism which can automatically adjust the gap between the brake drum and the brake shoes.

The presence of two shoe extension devices not only makes it difficult to arrange the brake fluid lines, but also increases the cost of the device.

A drum brake device which can provide a braking action equivalent to a 2L type has been disclosed in Japanese Utility Model Publication No. Showa 50 (1975)-38704. In this device, a shoe extension device is set between the one pair of adjacent ends of two facing brake shoes, and a crank mechanism, which functions together with the back plate, is set between the other pair of adjacent ends. This device has certain problems.

The addition of an automatic shoe clearance adjustment device to the shoe extension device increases its cost. In addition, the brake shoes at the shoe extension device side separate as the lining wears. Since an anchor to bear the braking force of the brake shoe is mounted in the device, it is difficult to install a parking brake device.

A spring is stretched on a lever so that the crank mechanism retains its neutral state when there is no braking. However, when the shoe clearance is being adjusted, the crank mechanism is supported on the back plate by only one fulcrum, whereby the spring forces acting on the mechanism become easily imbalanced. Unequal spring forces acting on the crank mechanism can cause the brake shoes to drag when the vehicle is in motion.

Since the large quantity of components in the crank mechanism, the large number of pivoting components, and the large number of points bearing the braking force, reduces the durability of the drum brake device, the heavier and stronger components must be used. Also, the layout is extremely complex, with the crank mechanism being arranged in a crowded space.

OBJECTS AND SUMMARY OF THE INVENTION

This invention was designed to resolve the aforementioned issues to be considered. To that end, one object of this invention is to provide a drum brake device like a duo-servo type equipped with a single primary shoe extension device which acts on both brake shoes as the service brake is applied, wherein the braking effect so obtained is equivalent to that of a two-leading drum brake device.

A second object of this invention is to provide a drum brake device which can easily incorporate both a secondary shoe extension device, which acts on both brake shoes as the parking brake is applied, and a shoe clearance adjustment device.

A third object of this invention is to provide a drum brake device of excellent durability.

The objects of this invention are obtained in a drum brake device comprising certain particular structure. Two facing brake shoes are provided on top of a back plate, each shoe having a shoe web. An anchor pin is mounted on the back plate and set between one pair of adjacent ends of the two facing brake shoes. A primary shoe extension device is mounted on the back plate in the vicinity of the anchor pin and positioned between the one pair of adjacent ends of the brake shoes which acts on both brake shoes when activated by the service brake. A link is set under on the shoe web of the one brake shoe having one end pivotable on the anchor pin, with a central segment of the link being functionally engaged with the one shoe web. The link and the other brake shoe are connected between the other pair of adjacent ends of the two facing brake shoes such that a braking force is mutually transferable between the two facing brake shoes.

The central segment of the link can be functionally engaged with the one shoe web by a pin inserted through a hole in the central segment of the link and engages with an aligned hole in the one shoe web. The device can further comprise a shoe clearance adjuster mounted between the link and the other brake shoe between the other pair of adjacent ends of the two brake shoes, the braking force being mutually transferred between the two brake shoes by the link and the shoe clearance adjuster.

A secondary shoe extension device can be provided which acts on both brake shoes when activated by the parking brake, the secondary shoe extension device being mounted between the one pair of adjacent ends of the two facing brake shoes.

The secondary shoe extension device can be of the forward-pull type or can be of the cross-pull type.

The drum brake device can further comprise an automatic shoe clearance adjustment device which senses the gap between the brake drum and both brake shoes and automatically makes an adjustment of the shoe clearance adjuster.

The automatic shoe clearance adjustment device can comprise an adjustment lever having a central segment pivotable on the shoe web of the other brake shoe, one end of the adjustment lever energized by a spring mechanism towards the anchor pin through a lever stopper, and the other end of the adjustment lever functionally engaged with the shoe clearance adjuster in order to sense and automatically adjust the gap between the brake drum and both brake shoes.

The spring mechanism can be set so as to be extendible between the anchor pin and the adjustment lever in order to prevent any damage to the components should an excessive thrust act upon the shoe clearance adjuster.

The automatic shoe clearance adjustment device can also comprise an adjustment lever pivotable at a central segment thereof on the shoe web of the other brake shoe in order to sense and automatically adjust the gap between the brake drum and both brake shoes, an adjustment link mounted between the one end of the adjustment lever and the anchor pin, a pole lever hooked so as to be rotatable on the other end of the adjustment lever, the other end of the pole lever being functionally engaged with the shoe clearance adjuster, and a spring mechanism attached to the pole lever so as to impart a tensile force on the adjustment link. In such a case, the spring mechanism can be set so as to be compressible between the pole lever and the other brake shoe in order to prevent any damage to the components should an excessive thrust act upon the shoe clearance adjuster.

Additionally, the present invention can also include a drum brake device comprising certain other structure. Two facing brake shoes can be provided on top of a back plate, each shoe having a shoe web. An anchor pin is mounted on the back plate and set between one pair of adjacent ends of the two facing brake shoes, one end of one brake shoe is pivoted to turn on the anchor pin, a semicircular arc segment on the one end of the other brake shoe is engaged so as to turn on the anchor pin. A link is set under on the shoe web of the one brake shoe having one end engaged with the wheel cylinder, and a central segment of the link functionally engaged with the one shoe web. A primary shoe extension device is mounted on the back plate in the vicinity of the anchor pin and positioned between the one pair of adjacent ends of the brake shoes which acts on the other brake shoe and one end of the link when activated by the service brake. A shoe clearance adjuster connects the other end of the link and the other end of the other brake shoe. A regulating mechanism is installed such that the other end of the link is allowed to turn in the direction to separate from the one brake shoe but is restricted from turning in the opposite direction, the braking force being mutually transferred between the two brake shoes by means of the link and the shoe clearance adjuster.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENTS

Example 1

One embodiment of this invention is explained next with reference to FIGS. 1–9.

Figure 1:
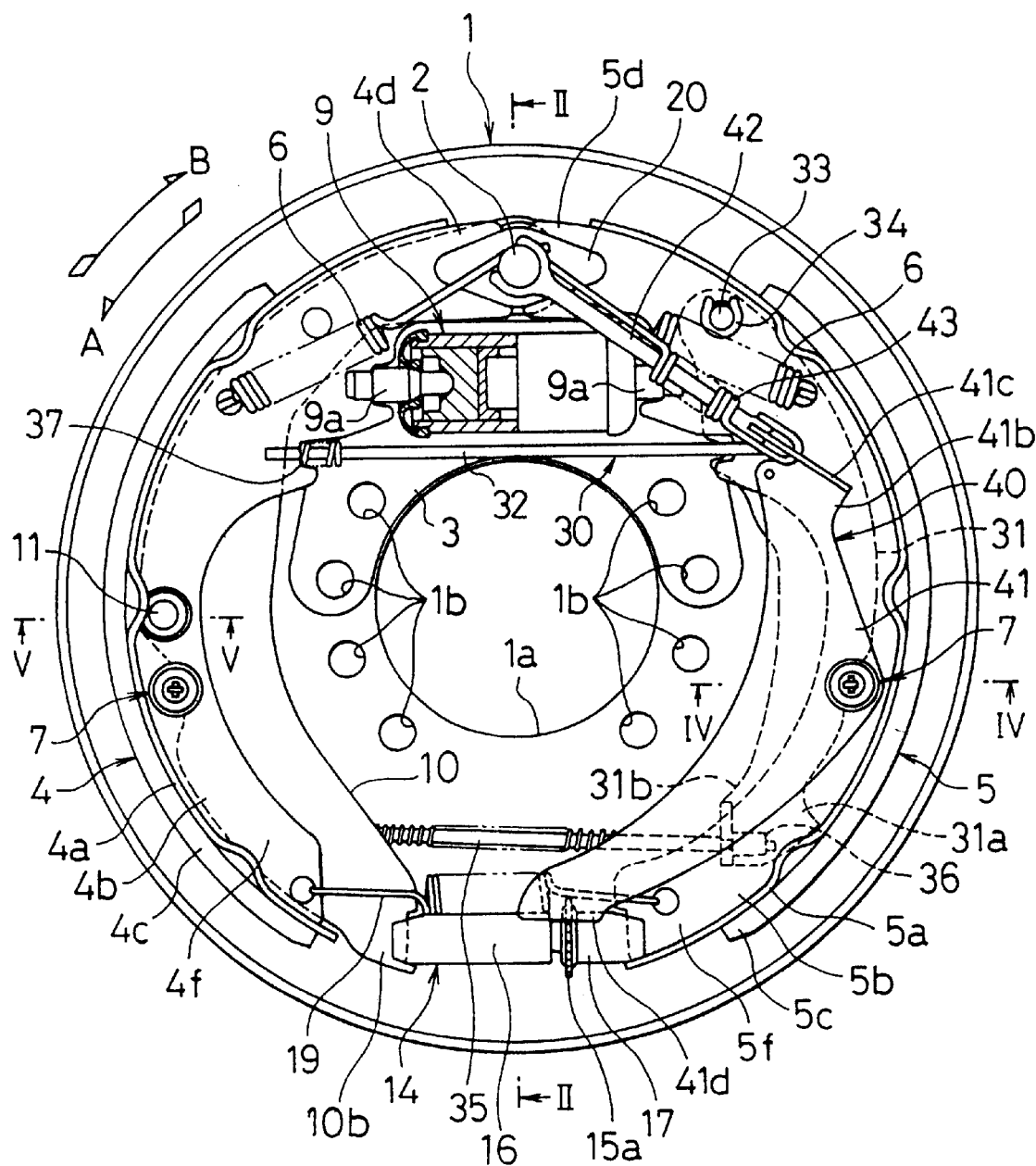
FIG. 1 is a plan view of the drum brake device of this invention as embodied in Example 1.
Figure 2:
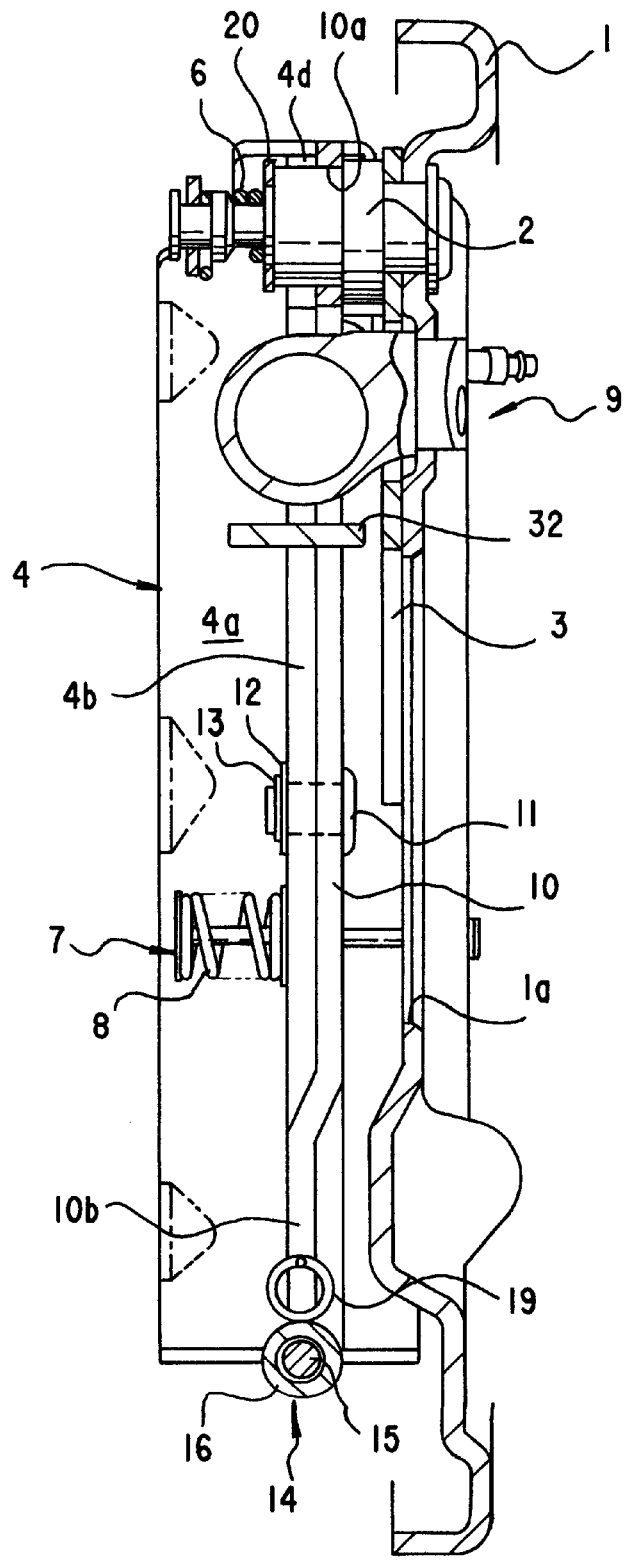
FIG. 2 is a cross section view of FIG. 1 taken along line II—II.
Figure 3:
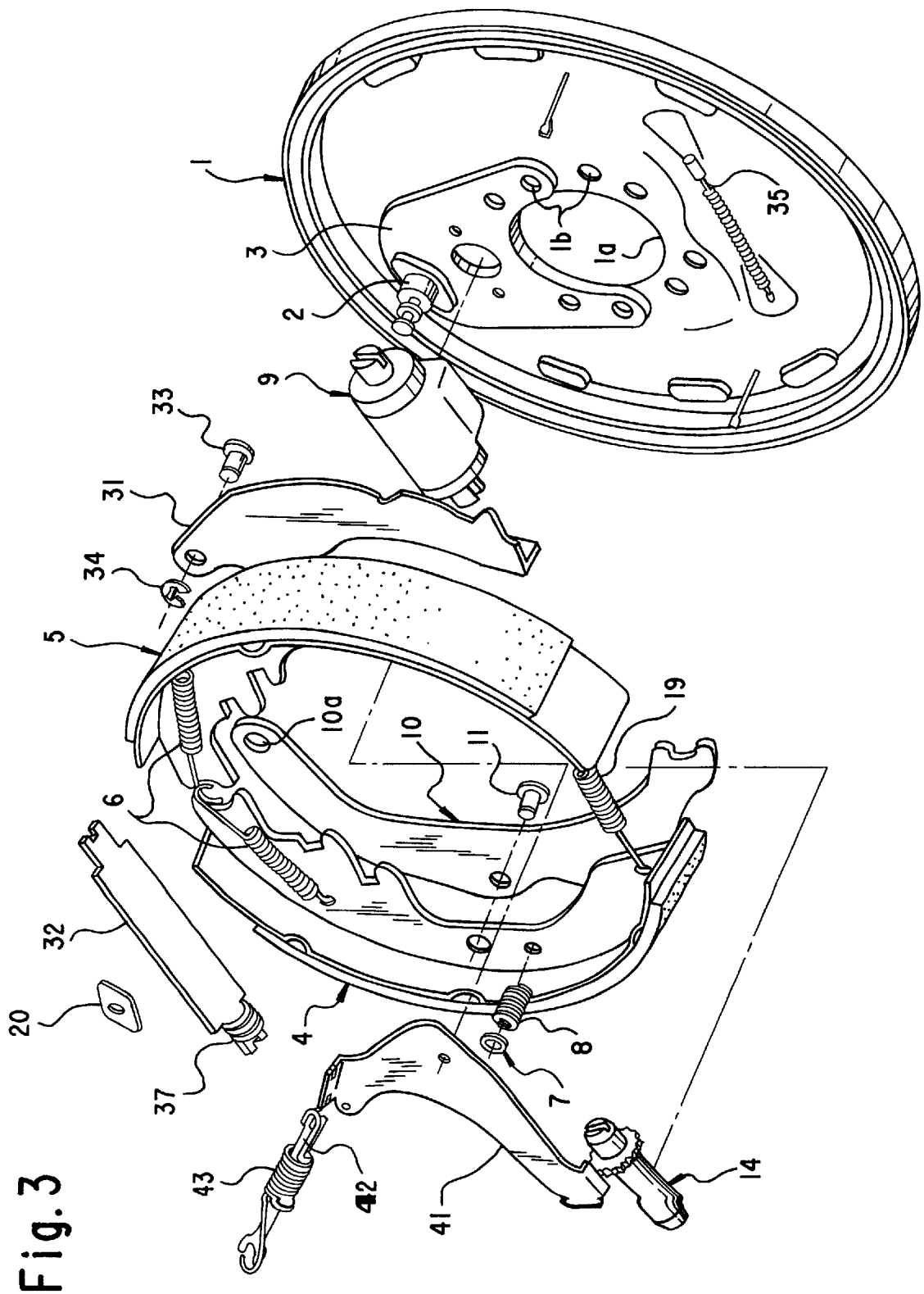
FIG. 3 illustrates the disassembled components of the drum brake device.

FIG. 1 is a plan view of the drum brake device, FIG. 2 is a cross section view of FIG. 1 as viewed when dissected longitudinally through the center, and FIG. 3 illustrates the disassembled components of the drum brake device.

A central hole 1a bored in the center of the back plate 1 is freely inlaid in the vehicle axle. The back plate is fixed to the vehicle body by four bolts inserted through the bolt holes 1b. An anchor pin 2 is affixed on the upper segment of the back plate, as shown in the diagram, and the periphery of the anchor pin 2 is reinforced by a stiffener 3 layered onto the back plate 1.

A pair of brake shoes 4, 5 are mounted to face each other on top of the back plate 1. Each brake shoe includes a shoe rim 4a, 5a and shoe webs 4b, 5b joined to the rim 4a, 5a to form a "T" in the cross section, and a lining 4c, 5c affixed around the perimeter of the shoe rim 4a, 5a. A shoe return spring 6, 6 is stretched between the anchor pin 2 and each brake shoe 4, 5, to bias the one pair of adjacent ends 4d, 5d of the brake shoes 4, 5 in the direction of the anchor pin 2. Each brake shoe 4, 5 is held elastically on top of the back plate 1 by a shoe-hold device 7, 7.

Figure 4:
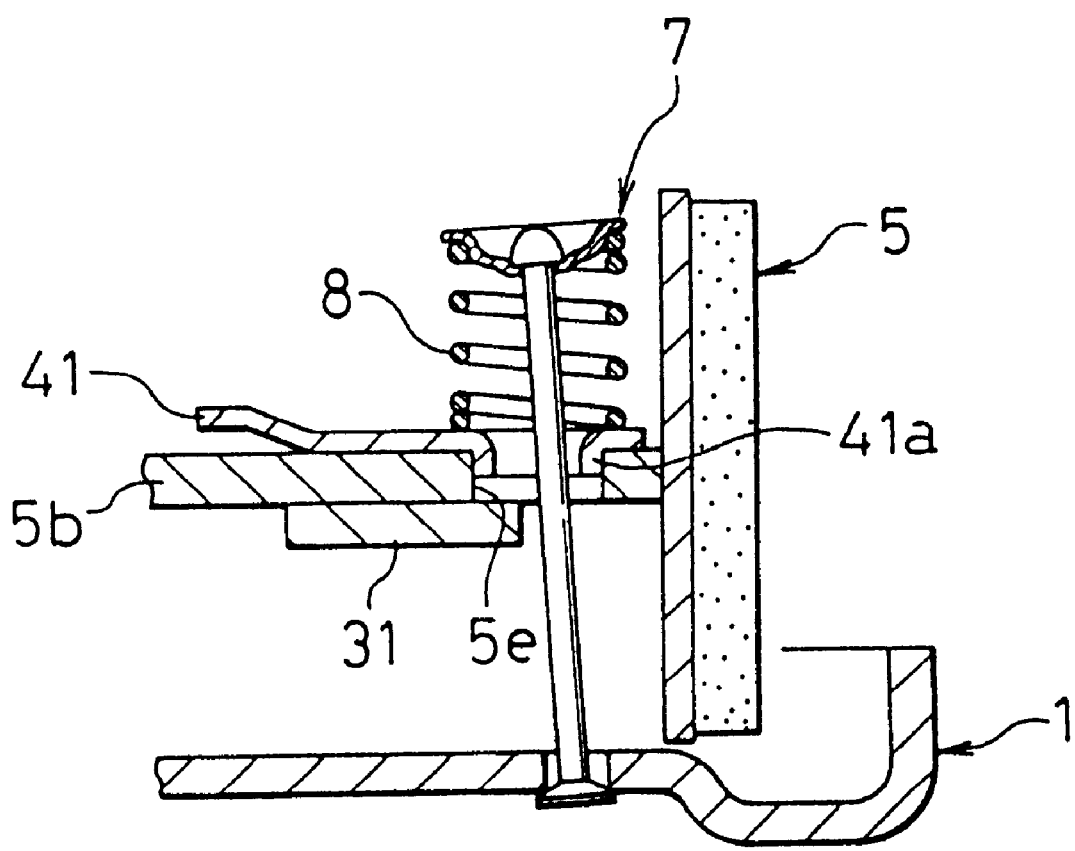
FIG. 4 is a cross section view of FIG. 1 taken along line IV—IV.

In this embodiment, the shoe-hold device 7, 7 holds its respective brake shoe at one point only, but the invention is not restricted to this design, and each brake shoe can be held at two locations. Moreover, the elastic element 8 of the shoe-hold device 7 can be a coil spring, as shown in FIG. 4, or a plate spring.

A primary shoe extension device 9 is affixed by bolts or other hardware on top of the back plate 1 in the vicinity of the anchor pin 2. The primary shoe extension device 9 is shown as a known hydraulically or pneumatically actuated wheel cylinder equipped with a pair of axially mounted push rods 9a, 9a which are extended outwardly from the cylinder as the service brake is applied. A notched groove on the end of each push rods 9a, 9a to engage the shoe web 4b, 5b on the one pair of adjacent ends 4d, 5d of the brake shoes 4, 5.

Figure 7:
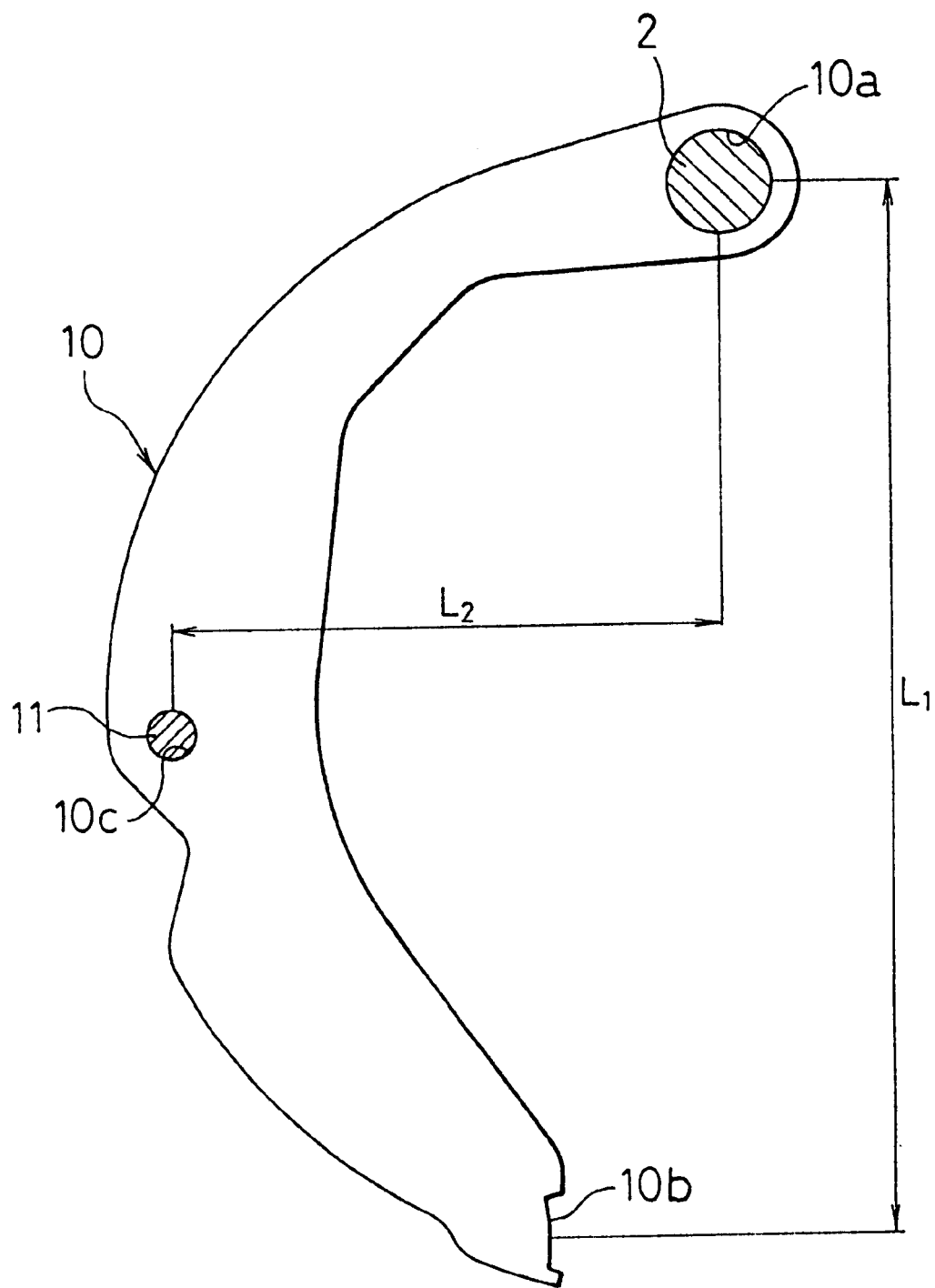
FIG. 7 explains the lever ratio of the link.

In this invention, the one brake shoe 4 does not abut directly against the shoe clearance adjuster 14, but instead abuts it indirectly by means of a link 10. Specifically, as shown in FIG. 7, a plate link 10 is set under on the shoe web 4b of the one brake shoe 4. The link 10 is pivotable about the anchor pin 2 which extends through a hole 10a bored at one end of the link.

Figure 5:
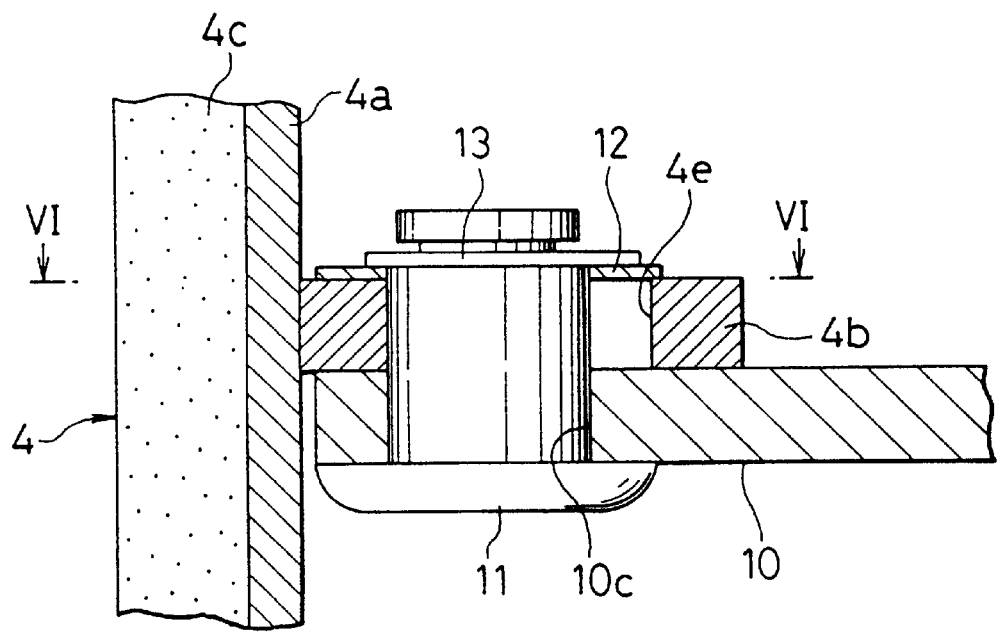
FIG. 5 is a cross section view of FIG. 1 taken along line V—V.
Figure 6:
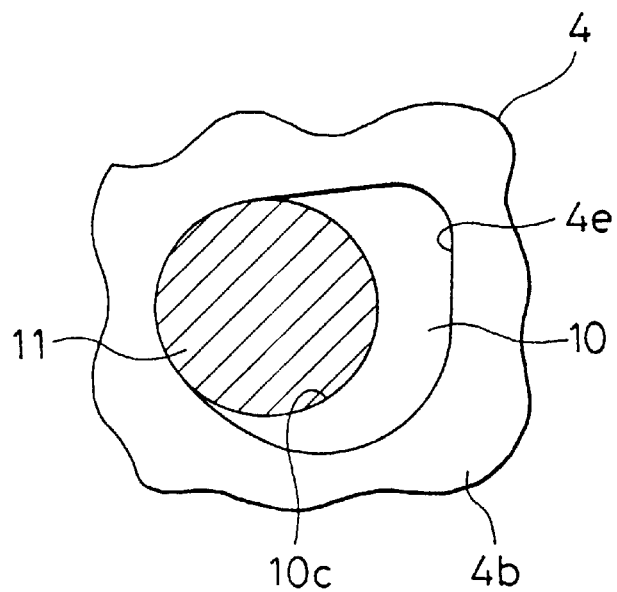
FIG. 6 is a cross section view of FIG. 5 taken along line VI—VI.

As shown in FIGS. 5–6, the link 10 is attached to the one brake shoe 4 by a pivot pin 11 penetrating through a hole 10c bored in the central segment of the link. The hole 10c is aligned with the hole 4e in the shoe web 4b, wherein the pivot pin 11 and hole 4e are engaged so as to transfer the braking force generated at one brake shoe 4 or 5 to the opposite brake shoe; thus the particular shape of hole 4e is not restricted to the form as shown in FIG. 6, but can be round or any other shape that will allow the interaction. A snap ring 13 fitted via a flat washer 12 over the pivot pin 11 prevents it from dislodging. Alternatively, the end of the pivot pin 11 can be pressed to be caulked. The retention force by the caulking will be greater than that of the snap ring.

The automatic shoe clearance adjustment device 40 which automatically adjusts the gap between the brake drum and the brake lining 4c, 5c is explained next.

Figure 8:
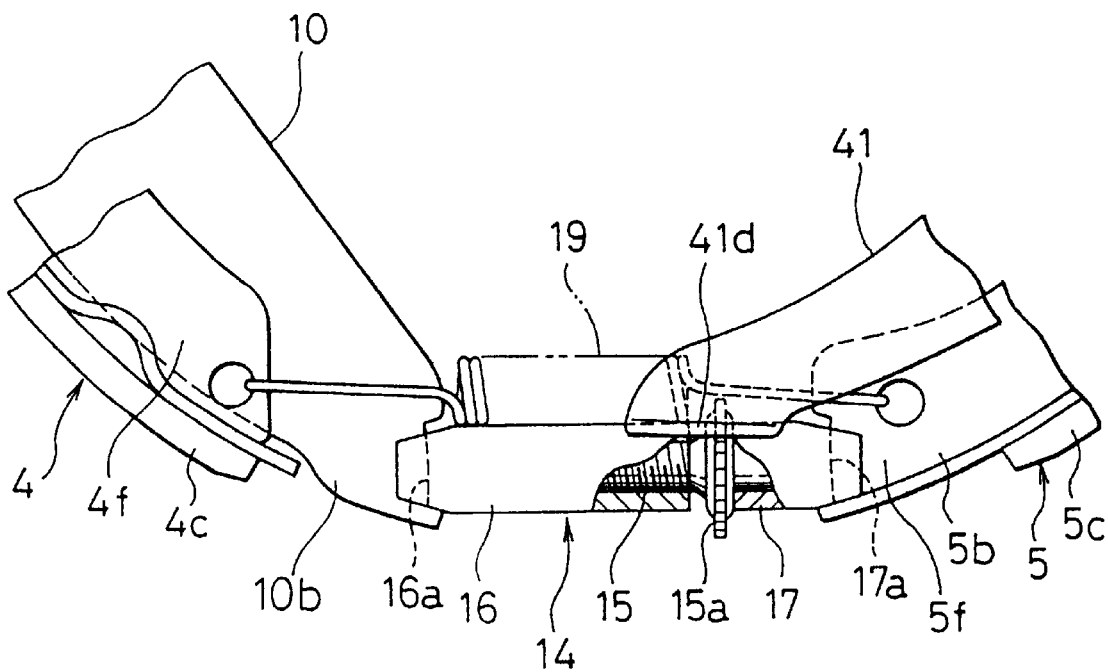
FIG. 8 is an enlarged diagram of the shoe clearance adjustment device as shown in FIG. 1.

As shown in FIG. 1, a shoe clearance adjuster 14 is provided between the other end 10b of the link 10 and the other end 5f of the brake shoe 5. The shoe clearance adjuster 14 adjusts the gap between the brake drum and the lining 4c, 5c. As shown in FIG. 8, the shoe clearance adjuster 14 includes a bolt 15 onto which a toothed adjustment wheel 15a is integrally molded, a nut 16, and a socket 17. A notched groove 16a formed on the nut 16 engages with the link 10, and a notched groove 17a formed on the socket 17 engages with the shoe web 5b of the other brake shoe 5.

The rotation of the adjustment lever 41 which meshes with the toothed adjustment wheel 15a automatically adjusts the entire length of the shoe clearance adjuster 14. As shown in FIG. 4, a cylindrical flange 41a, formed as a burr with a press, is integrally formed on the central segment of the adjustment lever 41. The flange 41a is pivotable within the hole 5e of shoe web 5b, and is elastically held on top of the shoe web 5b by the shoe-hold device 7. At the ends, the one end 41b of the adjustment lever 41 is bent upwards in the direction away from the shoe web 5b to form an upright plate 41c which engages with the notch 42a at one end of the lever stopper 42. The other end 41d of the adjustment lever 41 is functionally engaged with the toothed adjustment wheel 15a.

Figure 9:
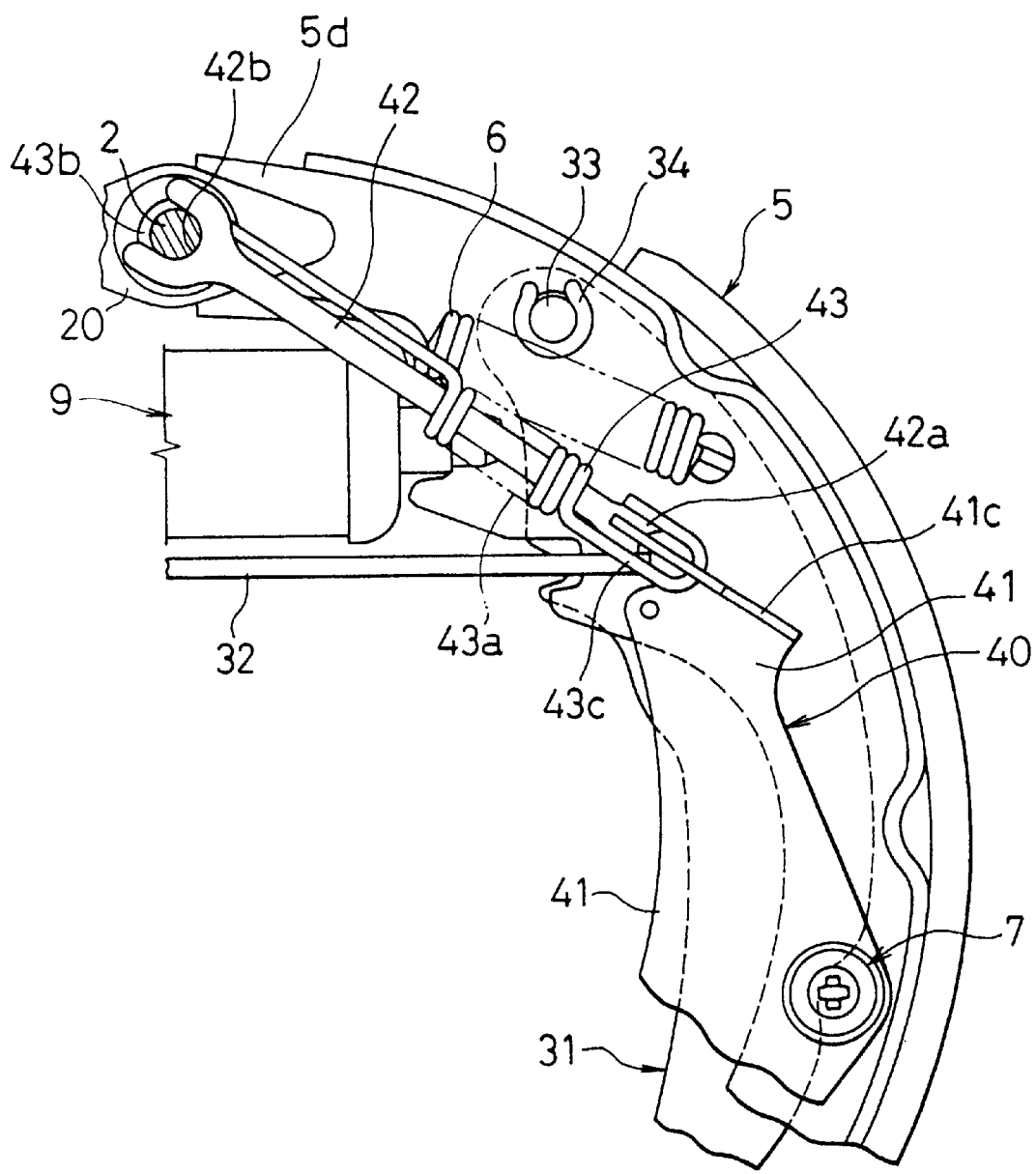
FIG. 9 is a partial enlarged diagram of the automatic shoe clearance adjustment device as shown in FIG. 1.

The lever stopper 42 is essentially a solid body, and as shown in the enlarged diagram of FIG. 9, the notch 42a at one end engages with the upright plate 41c of the adjustment lever 41. The notch 42b at the other end is pivotable around the anchor pin 2. The lever stopper 42 is engaged so as to be movable in its lengthwise direction, and tiltable with the point of abutment with the anchor pin 2 as the fulcrum. An adjustment spring 43 includes a central coil 43a, through which the lever stopper 42 is inserted, and two end hooks, 43b and 43c, extended between the anchor pin 2 and the upright lip 41c of the adjustment lever 41, respectively. This maintains the adjustment lever 41 and the lever stopper 42 at their set position. As an alternative to this extension type of adjustment spring 43, a coil spring can be compressed between the one end 41b of the adjustment lever 41 and the shoe rim 5a of the other brake shoe 5.

As shown in FIG. 1, a spring 19 is stretched between the other ends 4f, 5f of the brake shoes 4, 5. The spring 19 functions to prevent the displacement of the shoe clearance adjuster 14, to prevent the bolt 15 from self-rotating, and to maintain the engagement function between the one brake shoe 4 and the link 10. Instead of a single spring 19, one small spring can stretched between the one brake shoe 4 and the link 10, and another small spring can be stretched between the link 10 and the other brake shoe 5.

A guide plate 20, affixed to the anchor pin 2, restricts the lifting of the link 10 and the pair of adjacent ends 4d, 5d of the brake shoes 4, 5.

As shown in FIG. 1, the secondary shoe extension device 30 is basically includes a brake lever 31 and a strut 32. The brake lever 31 is superimposed on the shoe web 5b of the other brake shoe 5. The base end 31a of the brake lever 31 is pivotable by the pin 33 on the brake shoe 5. The cable end 36 of the control cable 35 is latched onto the other free end 31b.

The pin 33 is held in place by a C-shaped retainer 34 mounted on its tip. A protuberance 31a, formed around the periphery of the brake lever 31, abuts with the inner surface of the shoe rim 5a, thus regulating the return position of the brake lever 31 when there is no braking action. The plate strut 32 is notched on both ends, and straddles and engages the shoe web 4b of the one brake shoe 4 and the brake lever 31. An anti-vibration spring 37 controls the vibration of the strut 32. In FIG. 1, the secondary shoe extension device 30 is located on the inner brake side of the primary shoe extension device 9, but it can be set between the anchor pin 2 and the primary shoe extension device 9.

Using the configuration of FIG. 1, when a pressure is applied to the primary shoe extension device, the push rods 9a, 9a overcome the spring force of the shoe return springs 6, 6 and push upon the one pair of adjacent ends 4d, 5d of the brake shoes 4, 5 respectively. The one brake shoe 4 extends with the pivot pin 11 as the fulcrum such that its lining frictionally engages with the brake drum, not shown in the diagram. The other brake shoe 5 extends with the point of abutment with the socket 17 as the fulcrum such that its lining frictionally engages with the brake drum.

The braking action when the vehicle is moving forward or in reverse is explained next. If the brake drum is rotating forward in the direction of arrow A, the braking action of the one brake shoe 4 is that of a self-servo leading shoe. The force of this action is reduced by the lever ratio (L2/L1) of the link 10 as shown in FIG. 7, and the reduced force therein is transferred to the other brake shoe 5 via the shoe clearance adjuster 14.

The other brake shoe 5 is supported by the anchor pin 2 and also has a self-servo leading shoe braking action, but since the braking force of the one brake shoe 4 is not transferred directly, the overall braking force can be controlled to be greater than that of a leading-trailing (LT) drum brake device or less than that of a duo-servo (DS) drum brake device. A braking force equivalent to that of a two-leading (2L) drum brake device can be obtained by setting the lever ratio (L2/L1) of the link 10 to an appropriate value.

On the other hand if the brake drum is rotating in the reverse direction as shown by arrow B, the other brake shoe 5 has a self-servo leading shoe braking action with its point of abutment with the socket 17 as the fulcrum, and this force is transferred to the link 10 via the shoe clearance adjuster 14. This transferred force acts on the one brake shoe 4 with a leverage (L1/L2) that is the inverse of the above situation. The brake shoe 4 is supported by the anchor pin 2 and has a self-servo leading shoe braking action. In other words, a strong braking force equivalent to that of a duoservo (DS) drum brake device can be obtained when the vehicle is in reverse. In particular, if a 2L drum brake device is being used for the front brakes, then only a non self-servo trailing shoe braking force can obtained when the vehicle is in reverse motion, hence it is preferable that the braking force of the rear brakes be as high as possible, for which a drum brake device of the aforementioned configuration is most appropriate.

The action of the secondary shoe extension device 30 is explained next as based on the configuration of FIG. 1. If the control cable 35 is pulled, the brake lever 31 rotates clockwise, with the pin 33 as the fulcrum, to move the strut 32 to the left. This causes the one brake shoe 4 to overcome the spring force of the shoe return spring 6, and with the pivot pin 11 as the fulcrum, extends to frictionally engage with the brake drum.

If the control cable 35 is pulled further, a clockwise rotational force is imparted to the pin 33, with the point of abutment with the strut 32 as the fulcrum. This torque causes the other brake shoe 5 to overcome the spring force of the shoe return spring 6, and with its point of abutment with the socket 17 of the shoe clearance adjuster 14 as the fulcrum, extends to frictionally engage with the brake drum.

The braking action of the parking brake when the vehicle is on an incline is the same as that of the service brake, and an explanation is omitted.

The automatic shoe clearance adjustment action is explained next, as based on the configurations of FIG. 1 and FIG. 9. As described previously, when a pressure is applied on the primary shoe extension device 9, the two brake shoes 4, 5 extend such that the respective linings 4c, 5c frictionally engage with the brake drum. At this point, if the brake drum is rotating in the direction of arrow A, the one end 5d of the other brake shoe 5 impacts against the anchor pin 2 to generate a braking force, but since the adjustment lever 41 and the lever stopper 42 are rotating in tandem with the brake shoe 5, the relative positions of the other end 41d of the adjustment lever 41 and the toothed adjustment wheel 15a remain virtually unchanged, wherein the shoe clearance adjuster does not extend to make any adjustment.

Next, if the brake drum is rotating in the reverse direction of arrow B, the other brake shoe 5 and adjustment lever 41 essentially rotate in tandem until the one end 4d of the one brake shoe 4 impacts against the anchor pin 2. At this point, since the real connected length of the lever stopper 42 has not changed, the adjustment lever 41 receives the force of the adjustment spring 43, and while engaged with the lever stopper 42 rotates counterclockwise with the flange 41a as the fulcrum. Should the amount of movement of the other end 41d of the adjustment lever 41 exceed the corresponding pitch of the toothed adjustment wheel 15a, it engages with the next tooth when the brake is released.

As shown in the enlarged diagram of FIG. 8, at the next operation of the brake, the new tooth is rotated causing the bolt 15 to unscrew out of the nut 16 by an amount equivalent to the rotation, whereby the shoe clearance adjuster 14 is extended to automatically close the gap between the brake drum and the linings 4c, 5c.

Moreover, the friction force of the other brake shoe 5 is transferred to the shoe clearance adjuster 14, the link 10, and the one brake shoe 4. As the thrust of the shoe clearance adjuster 14 is augmented, the greater surface pressure of the screw will cause a sharp increase in the torque which rotates the toothed adjustment wheel 15a. However, at this point the adjustment spring 43 extends to free the lever stopper 42, and no damage is caused to the automatic adjustment components.

The automatic shoe clearance adjustment device 40 is made of components formed by a press and an extension coil spring and is therefore inexpensive. Moreover, the layout is simple since it is arranged on top of the other brake shoe 5.

The entire length of the shoe clearance adjuster 14 can be adjusted manually as follows. The plug mounted in the access hole of the back plate 1 is removed, then a regular screw driver or other hardware is inserted from outside the brake to turn the toothed adjustment wheel 15a in the direction as required to screw or unscrew the bolt.

Example 2

Figure 10:
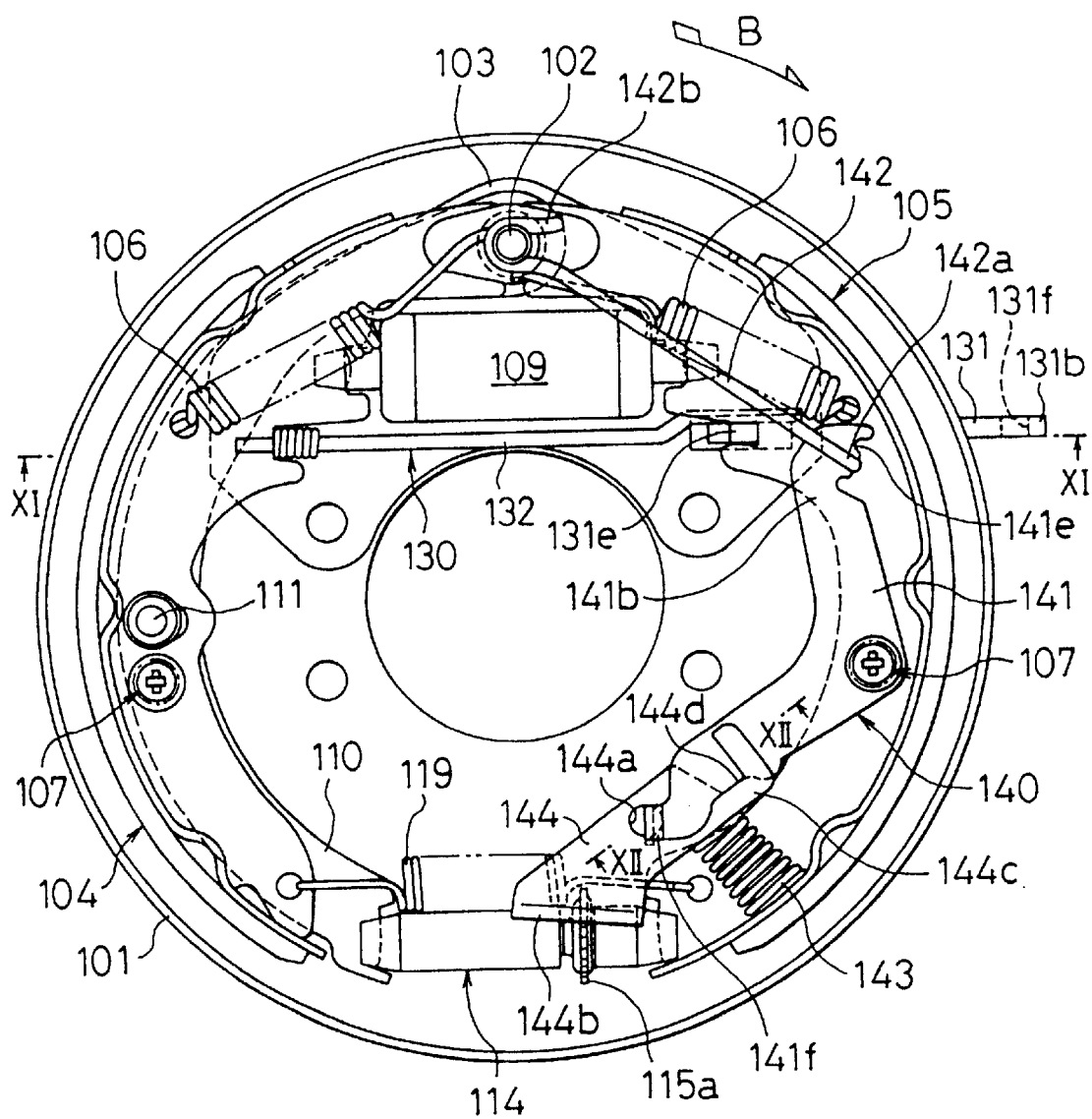
FIG. 10 is a plan view of the drum brake device of this invention as embodied in Example 2 and Example 3.
Figure 11:
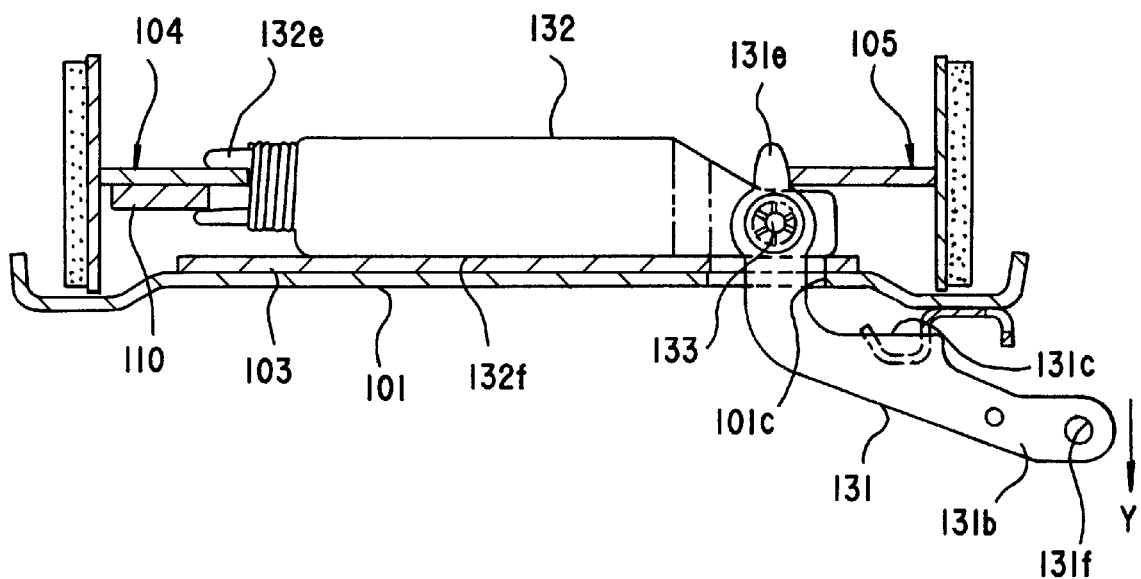
FIG. 11 is a cross section view of FIG. 10 taken along line XI—XI.

FIG. 10 and FIG. 11 illustrate another embodiment of the drum brake device equipped with a cross-pull type of secondary shoe extension device 130. In the following explanation of this embodiment, those components which are the same as in Example 1 are designated with a 100-series of numbers, and a detailed explanation is omitted here. Also, in order to simplify the drawings, FIG. 10 also includes the inscriptions for the subsequent Example 3.

This configuration comprises a back plate 101, anchor pin 102, stiffener 103, a pair of facing brake shoes 104, 105, shoe return springs 106, 106, shoe-hold devices 107, 107, primary shoe extension device 109, link 110, pivot pin 111, shoe clearance adjuster 114, and spring 119. The spring 119 can be replaced by one small spring set between the one brake shoe 104 and the link 110, and another small spring set between the link 110 and the other brake shoe 105.

The brake lever 131 is in the shape of a capital "L" with a stunted horizontal stroke. By section, its central segment inside the brake is pivotally engaged on a strut 132, to be described later, by a pin 133; the finger-shaped segment at one end is functionally engaged with the other brake shoe 105; and the other free end 131b freely penetrates through the hole 101c bored in the back plate 101. The flat surface 131c formed in the vicinity of this free end of the brake lever 131 regulates its return position when there is no braking action. A hole 131f is used to connect the control cable, not shown in the diagram.

One end of the strut 132 is pivoted on the brake lever 131, while the notch 132e formed on the other end is functionally engaged with the one brake shoe 104. The strut is positioned such that one side 132f rubs on top of the stiffener 103.

In this embodiment, the secondary shoe extension device 130 is located on the inner brake side of the primary shoe extension device 109, but it can be set between the anchor pin 102 and the primary shoe extension device 109.

The braking action when the service brake is applied is the same as that for Example 1, hence an explanation is omitted here.

When the parking brake is applied, as the control cable, not shown in the diagram, is pulled in the direction of arrow Y, the strut 132 is moved to the left with the point of abutment of the finger-shaped segment 131e with the other brake shoe 105 as the fulcrum. The force of this action causes the one brake shoe 104 to frictionally engage with the brake drum. Then, with the pin 133 as the fulcrum, the finger-shaped segment 131e moves to the right, causing the other brake shoe 105 to frictionally engage with the brake drum.

Example 3

Figure 12:
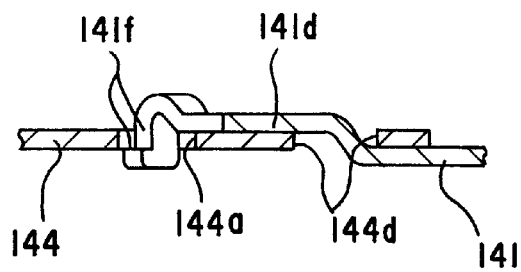
FIG. 12 is a cross section view of FIG. 1 taken along line XII—XII.

FIGS. 10–12 also illustrate an embodiment of the drum brake device fitted with another type of automatic shoe clearance adjustment device 140.

The automatic shoe clearance adjustment device 140 includes an adjustment lever 141, pole lever 144, adjustment link 142, and adjustment spring 143. The central segment of the adjustment lever 141 is pivotally mounted on the other brake shoe 105. At the ends, a plural number of semi-circular grooves 141e are molded on the one end 141b, where the link 142, described below, is latched at the appropriate place. The other end 141d is bent towards the back plate 101, and the pole lever 144, described below, is latched onto the stepped face 141f of the bent segment.

The adjustment link 142 is made from a relatively thick spring wire, and the U-shaped hook 142a on one end is latched in the groove 141e of the adjustment lever 141, while the U-shaped hook 142b on the other end is latched in the groove on the anchor pin 102. The adjustment link 142 can both turn and tilt with these latch points as the fulcrum. The bent segment of the adjustment lever 141 is inserted in a hole 144a bored in the central segment of the pole lever 144, which can thus turn clockwise as shown in FIG. 10 with its point of abutment with the stepped face 141f of the adjustment lever as the fulcrum. Also, the one end 144b of the pole lever 144 is functionally engaged with the toothed adjustment wheel 115a of the shoe clearance adjuster 114; and the bottom surface of the notch 144d on the other end 144c is connected to the adjustment lever 141 and both sides of the notch 144d straddle and link the adjustment lever 141 so that the notch 144d should functionally engage with the adjustment lever 141.

An adjustment spring 143 is compressed between the other brake shoe 105 and the pole lever 144, and as shown in FIG. 10, is energized such that the bottom of the notch 144d on the pole lever will press against the adjustment lever 141 next to the stepped segment, and through the pole lever, constantly biases the adjustment lever 141 in the clockwise direction.

The action of the automatic shoe clearance adjustment device 140 is explained based on FIG. 10. If a pressure is applied on the primary shoe extension device 109 as the brake drum, not shown in the diagram, rotates in the direction of arrow B, the central segment of the adjustment lever 141 moves while trailing the other brake shoe 105. At this point, since the link 142 is essentially a solid body, the adjustment lever rotates counter-clockwise with the pivoting point of its central segment as the fulcrum, and the pole lever 144 engaged with the lever also rotates in tandem. This causes the toothed adjustment wheel 115a of the shoe clearance adjuster 114 to rotate and close the gap.

As the thrust of the shoe clearance adjuster 114 is augmented, the adjustment spring 143 flexes such that the pole lever 144 can rotate clockwise with its hole 144a as the fulcrum to prevent any excess load on the automatic shoe clearance adjustment components.

Example 4

This invention is not restricted to the embodiments of Examples 1–3. For example, the combinations of the secondary shoe extension device 30 or 130 and automatic shoe clearance adjustment device 40 or 140 can be changed, or a different shoe clearance adjuster can be mounted.

Many other changes are feasible. For example, the secondary shoe extension device 30 or 130 and automatic shoe clearance adjustment device 40 or 140 are not mandatory, and need only be installed as necessary.

Example 5

FIGS. 13–20 illustrate another embodiment of the drum brake device. In explaining the configuration of this embodiment, those components which are the same as in Example 1 are designated with a 200-series of numbers, and a detailed explanation is omitted.

In this embodiment, one brake shoe 204 is pivotable on an anchor pin 202, and a link 210 is functionally engaged with the shoe extension devices 209, 230. The link 210 is pivoted to turn on the brake shoe 204, and is used as a lever, with the shoe clearance adjuster 214 as the fulcrum, to apply a force to extend the brake shoe 204.

This embodiment includes a back plate 201, an anchor pin 202, a stiffener 203, a pair of facing brake shoes 204, 205, a shoe return spring 206, shoe-hold devices 207, 207, a primary shoe extension device 209, a link 210, a pivot pin 211, a shoe clearance adjuster 214, a spring 219, a secondary shoe extension device 230, and an automatic shoe clearance adjustment device 240.

Figure 17:
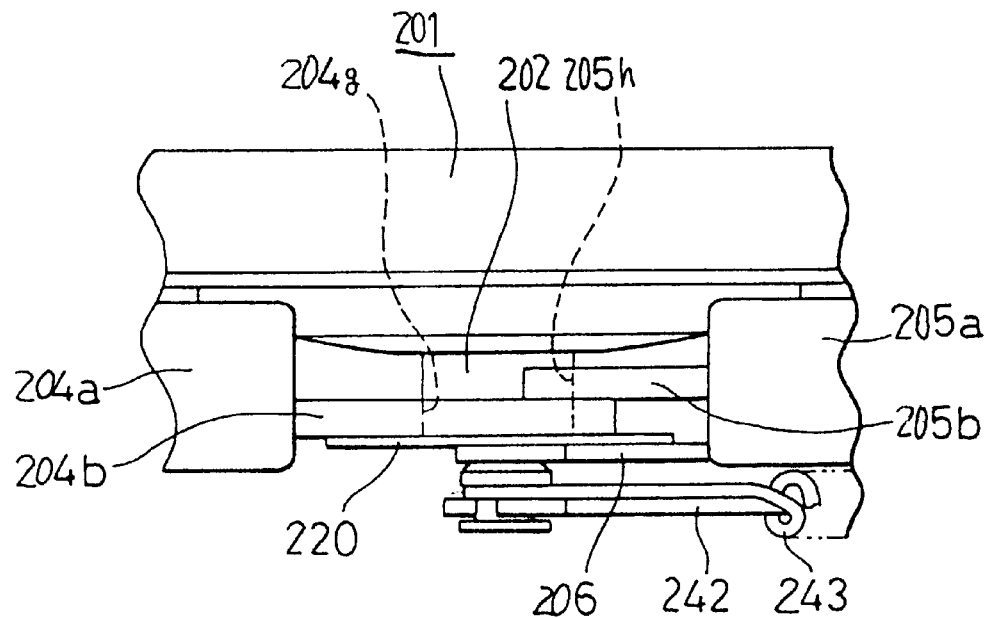
FIG. 17 is a view of FIG. 13 as observed from line XVII.
Figure 18:
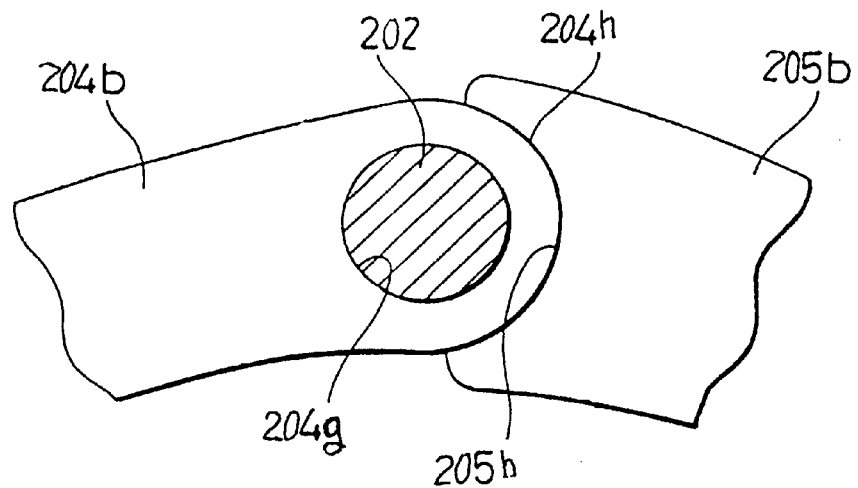
FIG. 18 is a plan view illustrating another anchoring of both brake shoes as embodied in Example 5.

An anchor hole 204g is bored on one end of the one brake shoe 204 with the anchor pin 202 extending therethrough. The brake shoe is thereby pivotable about the anchor pin 202. One end of the other brake shoe 205 is shaped into a concave semi-circular arc 205h which abuts the anchor pin 202 so as to be rotatable. In the example of FIG. 17, the semi-circular arc 205h is superimposed on one end of the one brake shoe 204, but as shown in FIG. 18, the semi-circular arc 205h can abut to engage with the convex semicircular arc 204h of the brake shoe 204.

The primary shoe extension device 209 is functionally engaged with the one end 210a of the link 210 and the shoe web 205b respectively. The central segment of the link 210 is pivotally mounted on the shoe web 204b by the pivot pin 211. In addition, a stopper 210c, molded along the inner face of the shoe rim 204a, protrudes around the periphery of the link 210 between its pivoted member and the other end 210b. This has been configured as a regulatory mechanism to allow the other end 210b of the link 210 to rotate in the direction to separate from the one brake shoe 204, while restricting its rotation in the opposite direction.

Figure 19:
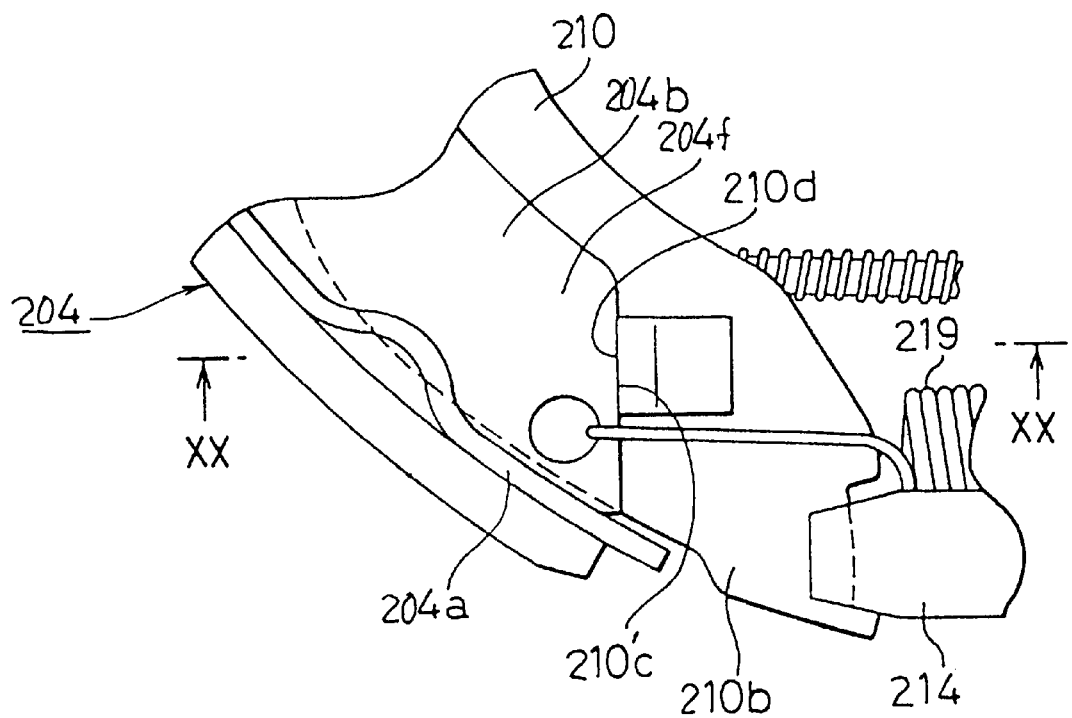
FIG. 19 is a plan view illustrating another state of abutment of the one brake shoe with the link.
Figure 20:
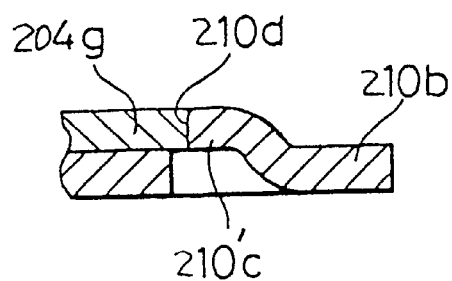
FIG. 20 is a cross section view of FIG. 19 taken along line XX—XX.

The regulatory mechanism is not restricted to this example. For example, as shown in FIGS. 19–20, a face 210d is a cutting segment formed from an extrusion die and set in the vicinity of the other end 210b of the link 210, and the face 210d can be the stopper 210'c to be supported on the peripheral face of the other end 204f of shoe web 204.

Figure 13:
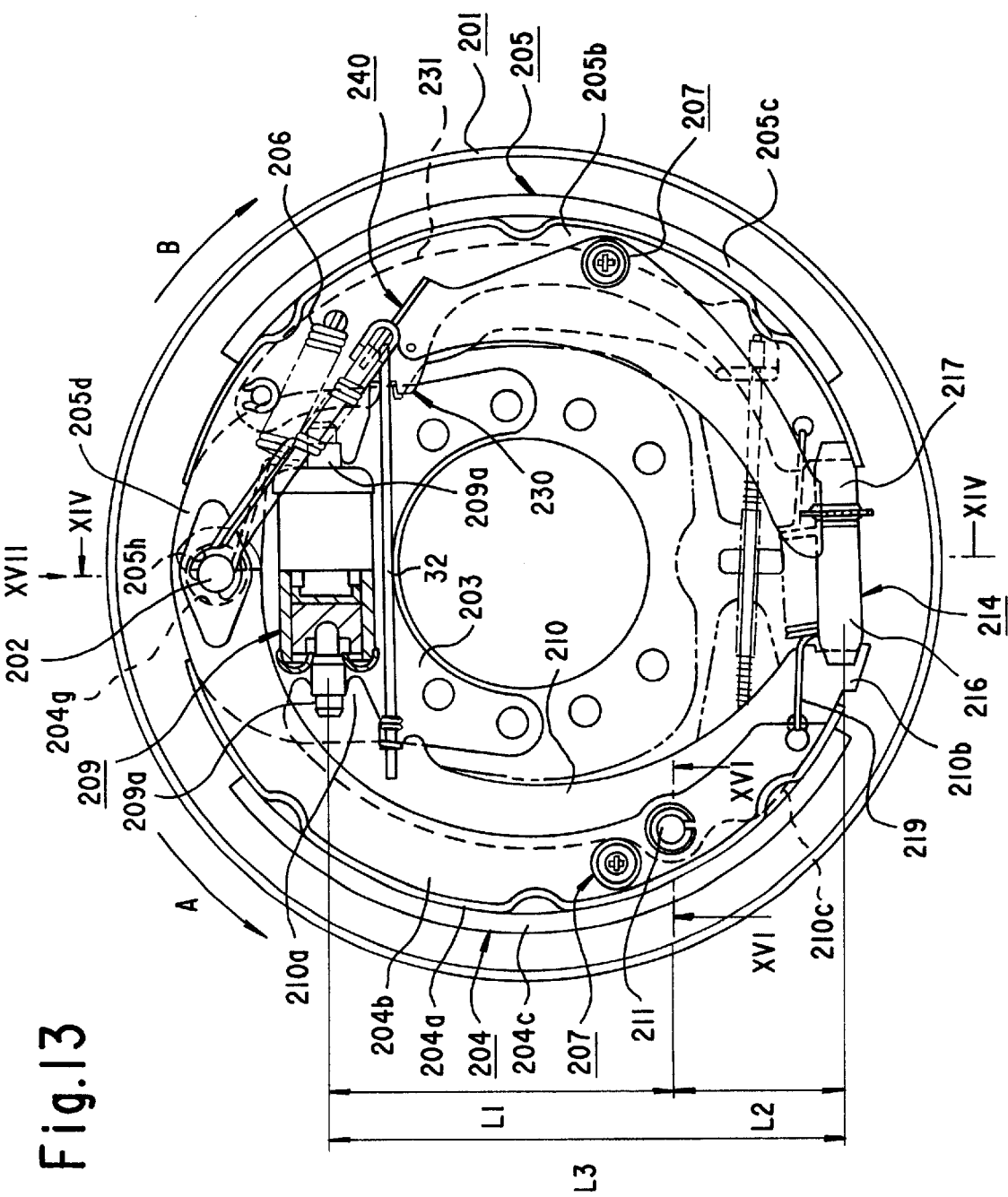
FIG. 13 is a plan view of the drum brake device of this invention as embodied in Example 5.
Figure 14:
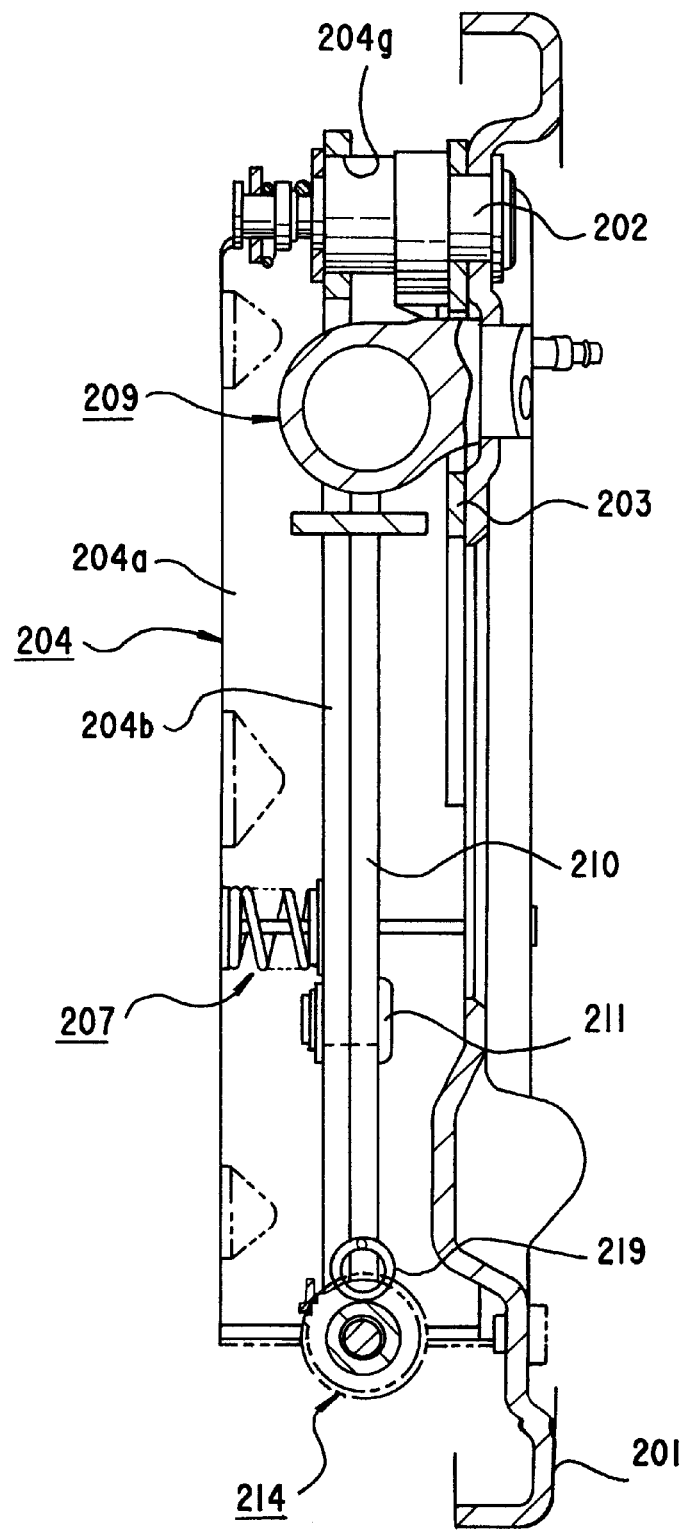
FIG. 14 is a cross section view of FIG. 13 taken along line XIV—XIV.
Figure 15:
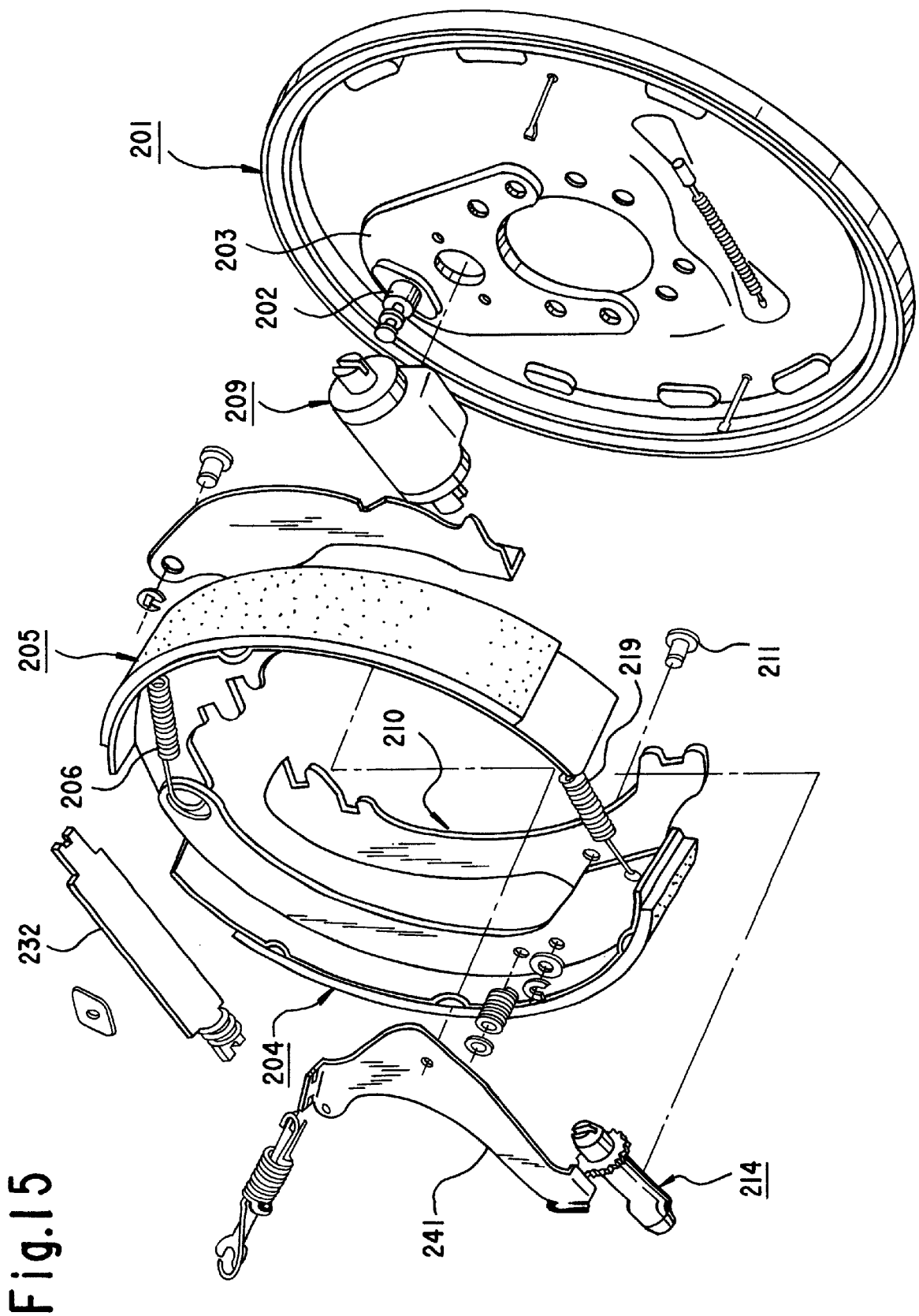
FIG. 15 illustrates the disassembled components of the drum brake device as embodied in Example 5.
Figure 16:
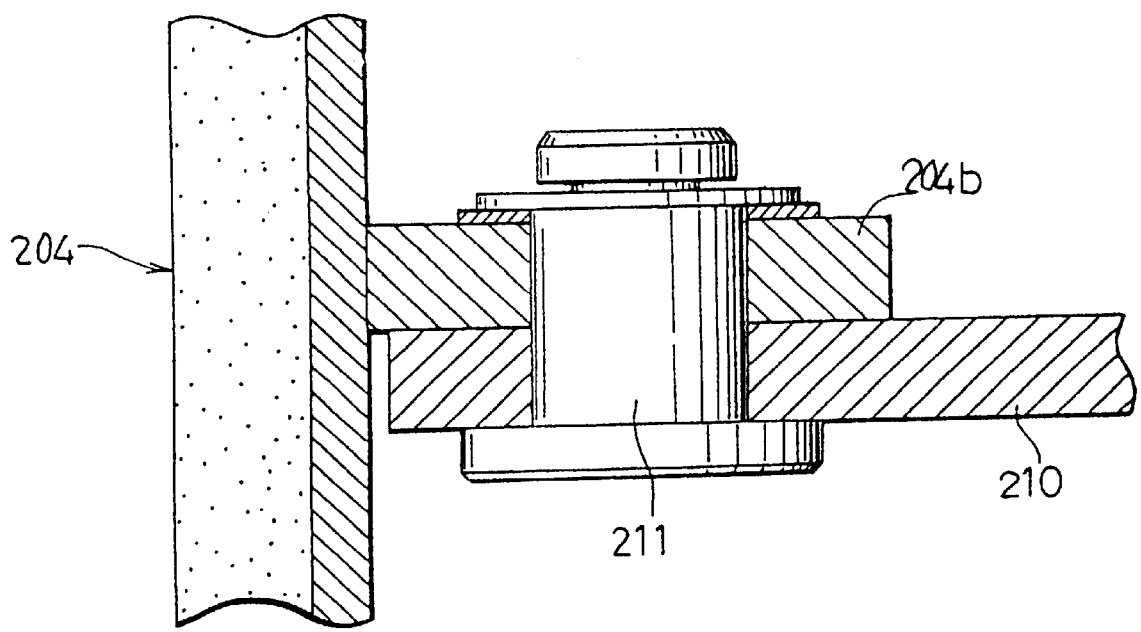
FIG. 16 is a cross section view of FIG. 13 taken along line XVI—XVI.

Using FIG. 13 as the reference, if a pressure is applied on the primary shoe extension device 209, the push rods 209a, 209a push against the one end 210a of the link 210 and push against the other brake shoe 205 at the side 205d when the force of the push rods 209a, 209a overcome the force of the shoe return spring 206. As the end 210a of the link 210 is pushed, the force of that action is transferred to the pivot pin 211 with its point of abutment with the nut 216 as the fulcrum, and the one brake shoe 204 extends with the anchor pin 202 as the fulcrum, whereby its lining 204c frictionally engages with the brake drum, not shown in the diagram. The other brake shoe 205 extends with its point of abutment with the socket 217 as the fulcrum, whereby its lining 205c frictionally engages with the brake drum.

If the brake drum is rotating forward in the direction of arrow A, the one brake shoe 204 has a non self-servo trailing shoe braking action. However, the force of the action from the push rod 209a increases with the lever ratio (L3/L2) of the link 210 and is transferred to the brake shoe 204 via the pivot pin 211.

The other brake shoe 205 is supported by the anchor pin 202 and has a self-servo leading shoe braking action, but the braking force of the one brake shoe 204 is not transferred directly, and the force of the action of the push rod 209a increases only by an amount equal to the lever ratio (L1/L2) of the link 210. As such, the overall braking force can be controlled to be greater than that of a leading trailing (LT) drum brake device or less than that of a duo-servo (DS) drum brake device. A braking force equivalent to that of a two-leading (2L) drum brake device can be obtained by setting the lever ratio (L1/L2) of the link 10 to an appropriate value.

On the other hand, if the brake drum is rotating in the reverse direction as indicated by arrow B, the other brake shoe 205 has a self servo leading shoe braking action, with its point of abutment with the shoe clearance adjuster 214 as the fulcrum, and that braking force is transferred to the link 210 via the shoe clearance adjuster 214. The force so transferred acts on the one brake shoe 204 through the stopper 210c or 210'c of the link 210, whereby the brake shoe 204 is supported by the anchor pin 202 and has a self-servo leading shoe braking action. In other words, a strong braking force equivalent to that of a duo-servo (DS) drum brake device can be obtained when the vehicle is in reverse. In particular, if a 2L drum brake device is being used for the front brakes, then only a non self-servo trailing shoe braking force can obtained when the vehicle is in reverse motion; hence, it is preferable that the braking force of the rear brakes be as high as possible, for which a drum brake device of the aforementioned configuration is most appropriate.

When the parking brake is applied, the only difference is that the secondary shoe extension device 230 is the point of action, and an explanation is omitted.

Example 6

Figure 21:
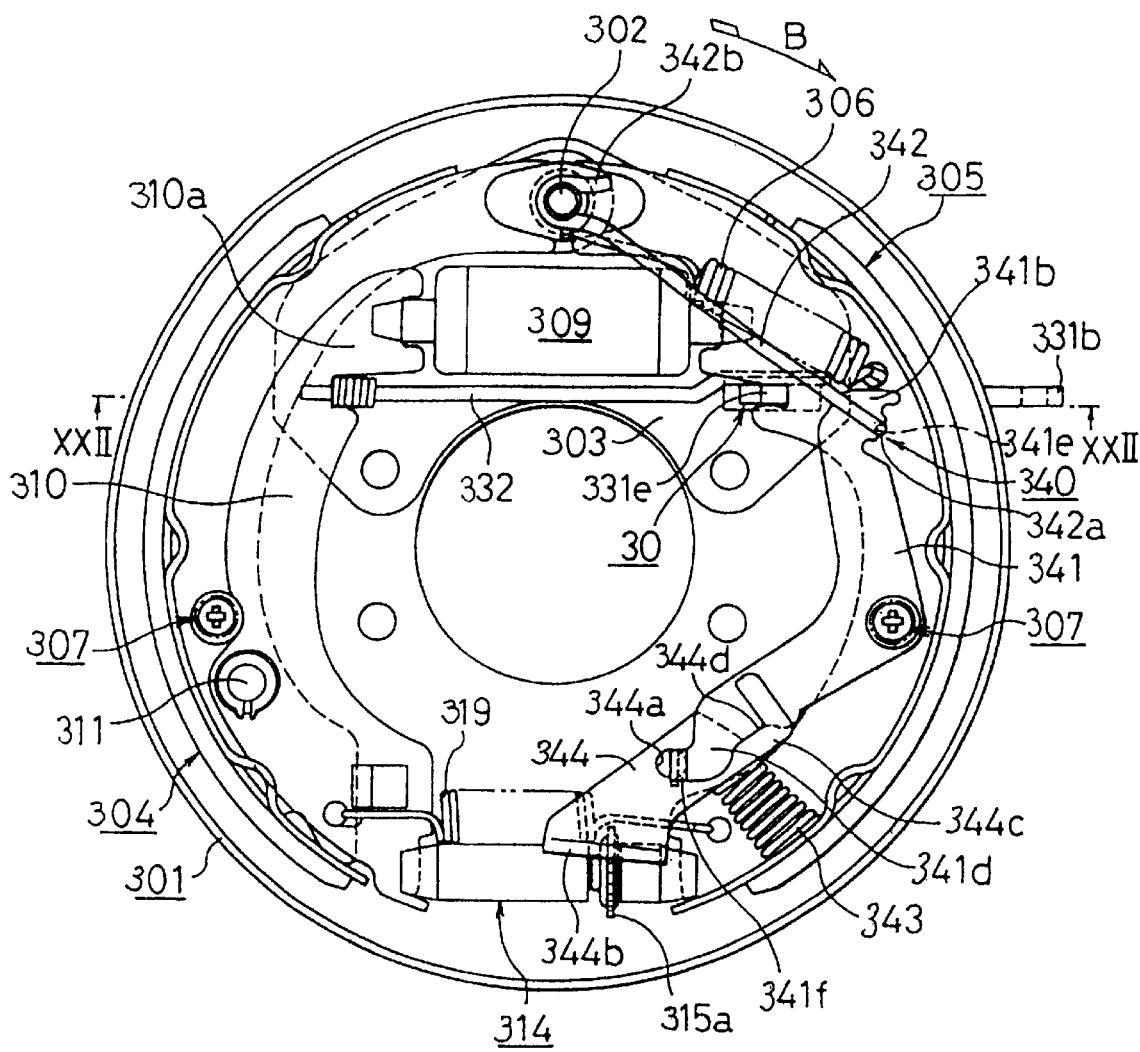
FIG. 21 is a plan view of the drum brake device of this invention as embodied in Example 6 and Example 7.
Figure 22:
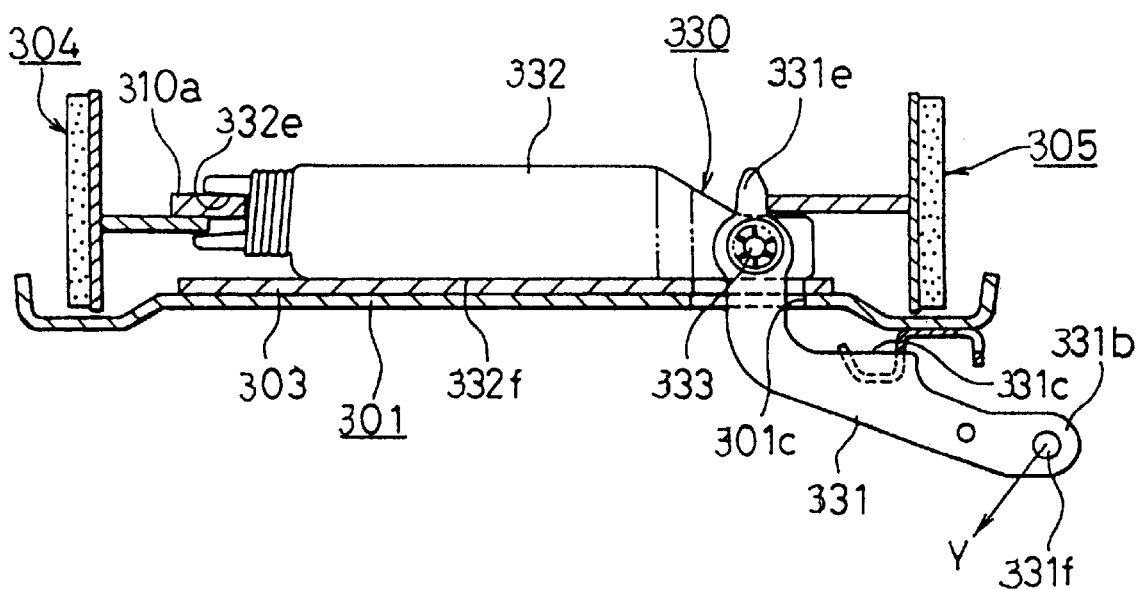
FIG. 22 is a cross section view of FIG. 21 taken along line XXII—XXII.

FIG. 21 and FIG. 22 illustrates the drum brake device as embodied in Example 5, but equipped instead with a cross-pull type of secondary shoe extension device 330. In explaining the configuration of this embodiment, those components which are the same as in the previous example are designated with a 300-series of numbers, for which a detailed explanation is omitted.

The drum brake device includes a back plate 301, an anchor pin 302, a stiffener 303, a pair of facing brake shoes 304, 305, shoe return springs 306, shoe-hold devices 307, 307, a primary shoe extension device 309, a link 310, a pivot pin 311, shoe clearance adjuster 314, and a spring 319. The spring 319 can be replaced by one small spring set between the one brake shoe 304 and the link 310, and another small spring set between the link 310 and the other brake shoe 305.

The brake lever 331 is in the shape of a capital "L" with a stunted horizontal stroke. By segment, the central segment of the brake lever 331 inside the brake is pivotable on a strut 332, to be described later, by a pin 333; the finger-shaped segment 331e at one end is functionally engaged with the other brake shoe 305; and the other free end 331b freely penetrates through the hole 301c bored in the back plate 301. The flat surface 331c molded in the vicinity of the free end of the brake lever 331 regulates its return position when there is no braking action. A hole 331f is used to connect the control cable, not shown in the diagram.

One end of the strut 332 is pivoted on the brake lever 331, while the notch 332e formed on the other end is functionally engaged with the one end 310a of the link 310. The strut is positioned such that one side 332f rubs on top of the stiffener 303.

In this embodiment, the secondary shoe extension device 330 is located on the inner brake side of the primary shoe extension device 309, but it can be set between the anchor pin 302 and the primary shoe extension device 309.

The braking action when the service brake is applied is the same as that of the embodiment of Example 5, and an explanation is omitted.

When the parking brake is applied, as the control cable, not shown in the diagram, is pulled in the direction of arrow Y, the strut 332 is moved to the left with the point of abutment of the finger-shaped segment 331e with the other brake shoe 305 as the fulcrum. The force of this action causes the one brake shoe 304, via the link 310, to frictionally engage with the brake drum. Then, with the pin 333 as the fulcrum, the finger-shaped segment 331e moves to the right, causing the other brake shoe 305 to frictionally engage with the brake drum.

Example 7

FIG. 21 also illustrates an embodiment of the drum brake device in which the automatic shoe clearance adjustment device as explained in Example 3 is combined with the drum brake device of Example 5.

The automatic shoe clearance adjustment device 340 is identical to that explained in Example 3 (FIG. 10 and FIG. 12). Therefore, those components which are the same as in Example 3 are designated with a 300-series of numbers, and a detailed explanation of the configuration and braking action is omitted.

Example 8

Many other variations of the drum brake device are possible. For example, the combinations of the secondary shoe extension device 230 or 330 and the automatic shoe clearance adjustment device 240 or 340 as described in the embodiments of Examples 5–7 can be changed, or even another type of automatic shoe clearance adjustment device can be added. Alternatively, the secondary shoe extension device 230 or 330 and the automatic shoe clearance adjustment device 240 or 340 are not mandatory, and need only be installed as necessary.

This invention can provide the following advantages.

A single shoe extension device activated when the service brake is applied plus a simple link mechanism can provide a stable braking force equivalent to a two-leading drum brake device, as well as facilitating the arrangement of the brake fluid lines.

Only a simple link mechanism has been added to the basic configuration of a duo-servo type of drum brake device, thus facilitating the installation of the parking brake device.

Aside from easier installation of the parking brake device, the configuration of this invention also facilitates the incorporation of an automatic shoe clearance adjustment device.

Adjustment of the clearance between the brake drum and the brake shoes is basically the same as for the conventional duo-servo type; thus adjustment presents virtually no problems, nor are there any concerns about a misadjustment which would cause a dragging by closing one brake shoe.

The link mechanism has few components, which greatly reduces the number of fabrication steps, and the concomitant reduction in the number of pivoting parts ensures long-term reliability.

The link need only be affixed on top of the shoe web, making for an extremely simple layout which results in a substantial cost saving.

The secondary shoe extension device can be either a forward-pull or cross pull type, making the device more suitable as a general-purpose drum brake device.

Brakes are applied much more often when the vehicle is advancing forward rather than reversing. In the embodiments of Example 5 and Example 6, both brake shoes become pivot-type shoes, wherein the horizontal center of the brake (FIG. 13 and FIG. 21) is the first segment to engage with the brake drum, and is the region of the lining to be worn the most. This makes for effective use of the lining.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What we claim is:

1. A drum brake device comprising:
    a back plate;
    two facing brake shoes on top of said back plate, each shoe having a shoe web;
    an anchor pin mounted on said back plate and engaged by one pair of adjacent ends of said two facing brake shoes;
    a primary shoe extension device mounted on said back plate in the vicinity of said anchor pin and positioned between the one pair of adjacent ends of said brake shoes which spreads open said adjacent ends of both brake shoes when activated by a service brake;
    a link provided adjacent the shoe web of the one brake shoe having one end pivotable on said anchor pin, and a central segment of said link functionally engaged with said one shoe web; and
    means provided between the other pair of adjacent ends of the two facing brake shoes connecting said link and the other brake shoe for mutually transferring a braking force between the two facing brake shoes.

2. A drum brake device as claimed in claim 1, wherein said central segment of said link is functionally engaged with said one shoe web by a pin inserted through a hole in said central segment of said link and engages with an aligned hole in said one shoe web, and said device further comprises:
    a shoe clearance adjuster mounted between said link and the other brake shoe between the other pair of adjacent ends of the two brake shoes, the braking force being mutually transferred between the two brake shoes by said link and said shoe clearance adjuster.

3. A drum brake device as claimed in claim 1 or claim 2 further comprising a secondary shoe extension device which acts on both brake shoes when activated by a parking brake, said secondary shoe extension device being mounted between the one pair of adjacent ends of said two facing brake shoes.

4. A drum brake device as claimed in claim 3, wherein said secondary shoe extension device is of the forward-pull type.

5. A drum brake device as claimed in claim 3, wherein said secondary shoe extension device is of the cross-pull type.

6. A drum brake device as claimed in claim 2, further comprising an automatic shoe clearance adjustment device which senses the gap between the brake drum and both brake shoes and automatically makes an adjustment of said shoe clearance adjuster.

7. A drum brake device as claimed in claim 6, wherein said automatic shoe clearance adjustment device comprises an adjustment lever having a central segment pivotable on the shoe web of said other brake shoe, one end of said adjustment lever energized by a spring mechanism towards the anchor pin through a lever stopper, and the other end of said adjustment lever functionally engaged with the shoe clearance adjuster in order to sense and automatically adjust the gap between the brake drum and both brake shoes.

8. A drum brake device as claimed in claim 7, wherein said spring mechanism is set so as to be extendible between said anchor pin and said adjustment lever should an excessive thrust act upon said shoe clearance adjuster.

9. A drum brake device as claimed in claim 6, wherein said automatic shoe clearance adjustment device comprises an adjustment lever pivotable at a central segment thereof on the shoe web of said other brake shoe in order to sense and automatically adjust the gap between the brake drum and both brake shoes, an adjustment link mounted between the one end of said adjustment lever and said anchor pin, a pole lever hooked so as to be rotatable on the other end of said adjustment lever, the other end of said pole lever being functionally engaged with said shoe clearance adjuster, and a spring mechanism attached to said pole lever so as to impart a tensile force on said adjustment link.

10. A drum brake device as claimed in claim 9, wherein said spring mechanism is set so as to be compressible between said pole lever and the other brake shoe should an excessive thrust act upon said shoe clearance adjuster.

11. A drum brake device comprising:
    back plate;
    two facing brake shoes on top of said back plate, each shoe having a shoe web;
    an anchor pin mounted on said back plate and set between one pair of adjacent ends of said two facing brake shoes, one end of one brake shoe being pivotally mounted to turn on said anchor pin, a semicircular arc segment on the one end of the other brake shoe being pivotally engaged on the anchor pin;
    a primary shoe extension device mounted on said back plate in the vicinity of said anchor pin and positioned between the one pair of adjacent ends of said brake shoes which spreads open one end of the other brake shoe and one end of said link when activated by a service brake;
    a link provided adjacent the shoe web of the one brake shoe having a central segment of said link functionally engaged with said one shoe web; and
    means provided between the other pair of adjacent ends of the two facing brake shoes connecting said link and the other brake shoe for mutually transferring a braking force between the two facing brake shoes.

12. A drum brake device as claimed in claim 11, wherein said central segment of said link is functionally engaged with said one shoe web by a pin inserted through a hole in said central segment of said link and engages with an aligned hole in said one shoe web, and
    a shoe clearance adjuster mounted between said link and the other brake shoe between the other pair of adjacent ends of the two brake shoes; and
    a regulating mechanism installed such that the other end of said link is allowed to turn in the direction to separate from the one brake shoe but is restricted from turning in the opposite direction, the braking force being mutually transferred between the two brake shoes by said link and said shoe clearance adjuster.

13. A drum brake device as claimed in claim 11 or claim 12 further comprising a secondary shoe extension device activated by a parking brake mounted between the one end of said link and the other brake shoe.

14. A drum brake device as claimed in claim 13, wherein said secondary shoe extension device is of a forward-pull type.

15. A drum brake device as claimed in claim 14, wherein said secondary shoe extension device is of a cross-pull type.

16. A drum brake device as claimed in claim 12, further comprising an automatic shoe clearance adjustment device which senses a gap between the brake drum and both brake shoes and automatically makes an adjustment of said shoe clearance adjuster mounted to the side of said other brake shoe.

17. A drum brake device as claimed in claim 16, wherein said automatic shoe clearance adjustment device comprises an adjustment lever having a central segment pivotable on the shoe web of said other brake shoe, one end of said adjustment lever energized by a spring mechanism towards the anchor pin through a lever stopper, and the other end of said adjustment lever functionally engaged with the shoe clearance adjuster in order to sense and automatically adjust the gap between the brake drum and both brake shoes.

18. A drum brake device as claimed in claim 17, wherein said spring mechanism is set so as to be extendible between said anchor pin and said adjustment lever should an excessive thrust act upon said shoe clearance adjuster.

19. A drum brake device as claimed in claim 16, wherein said automatic shoe clearance adjustment device comprises an adjustment lever pivotable at a central segment thereof on the shoe web of said other brake shoe in order to sense and automatically adjust the gap between the brake drum and both brake shoes, an adjustment link mounted between the one end of said adjustment lever and said anchor pin, a pole lever hooked so as to be rotatable on the other end of said adjustment lever, the other end of said pole lever being functionally engaged with said shoe clearance adjuster, and a spring mechanism attached to said pole lever so as to impart a tensile force on said adjustment link.

20. A drum brake device as claimed in claim 19, wherein said spring mechanism is set so as to be compressible between said pole lever and the other brake shoe should an excessive thrust act upon said shoe clearance adjuster.

* * * * *

UNITED STATES PATENT AND TRADEMARK OFFICE
CERTIFICATE OF CORRECTION

PATENT NO.    : 5,924,529
DATED         : July 20, 1999
INVENTOR(S)   : Takashi Ikeda, et al.

It is certified that error appears in the above-identified patent and that said Letters Patent is hereby corrected as shown below:

Column 7, line 1, change "leverage" to --lever ratio--.

Signed and Sealed this

Second Day of November, 1999

Q. TODD DICKINSON

Attest:

Attesting Officer

Acting Commissioner of Patents and Trademarks